United States Patent
Liu et al.

(10) Patent No.: US 11,887,020 B2
(45) Date of Patent: Jan. 30, 2024

(54) THERMAL LOAD PREDICTION METHOD AND APPARATUS, READABLE MEDIUM, AND ELECTRONIC DEVICE

(71) Applicant: ENNEW Technology Co., Ltd., Langfang (CN)

(72) Inventors: Shengwei Liu, Langfang (CN); Xin Huang, Langfang (CN)

(73) Assignee: ENNEW Technology Co., Ltd., Langfang (CN)

(*) Notice: Subject to any disclaimer, the term of this patent is extended or adjusted under 35 U.S.C. 154(b) by 579 days.

(21) Appl. No.: 17/058,137

(22) PCT Filed: Sep. 25, 2019

(86) PCT No.: PCT/CN2019/107928
§ 371 (c)(1),
(2) Date: Nov. 24, 2020

(87) PCT Pub. No.: WO2020/063686
PCT Pub. Date: Apr. 2, 2020

(65) Prior Publication Data
US 2021/0304045 A1    Sep. 30, 2021

(30) Foreign Application Priority Data
Sep. 25, 2018  (CN) .......................... 201811113972.6

(51) Int. Cl.
*G06N 7/01*    (2023.01)
*G06F 30/27*   (2020.01)
(Continued)

(52) U.S. Cl.
CPC .............. *G06N 7/01* (2023.01); *G06F 30/27* (2020.01); *G06F 2111/08* (2020.01); *G06F 2119/08* (2020.01)

(58) Field of Classification Search
CPC .. G06F 30/27; G06F 2119/08; G06F 2111/08; G06N 7/01
See application file for complete search history.

(56) References Cited

U.S. PATENT DOCUMENTS

| 2008/0300879 A1* | 12/2008 | Bouchard | ............. G06F 11/008 |
| | | | 704/E15.001 |
| 2017/0278116 A1 | 9/2017 | Singhee | |
| 2018/0088939 A1* | 3/2018 | Strachan | ................. G06N 7/01 |

FOREIGN PATENT DOCUMENTS

| CN | 103400204 A | 11/2013 |
| CN | 104850916 A | 8/2015 |

(Continued)

*Primary Examiner* — Chuen-Meei Gan
(74) *Attorney, Agent, or Firm* — Bayramoglu Law Offices LLC

(57) ABSTRACT

A thermal load prediction method and apparatus. The method includes configuring multiple prediction states and corresponding error thresholds and forming a prediction model. The prediction model predicting first thermal load magnitudes respectively corresponding to multiple testing time periods, wherein a target steam user uses boiler steam in the multiple testing time periods. Determining, according to the first thermal load magnitudes, relative prediction errors respectively corresponding to the multiple testing time periods Forming a state transition probability matrix according to the relative prediction errors, and determining a state probability of each prediction state in each future time period of future time periods according to the state transition probability matrix. The prediction model predicting second thermal load magnitudes respectively corresponding to the future time periods; and for the each future time period, determining a thermal load range corresponding to the each future time period according to the second thermal load magnitudes.

20 Claims, 3 Drawing Sheets

(51) Int. Cl.
  *G06F 119/08* (2020.01)
  *G06F 111/08* (2020.01)

(56) References Cited

FOREIGN PATENT DOCUMENTS

| | | |
|---|---|---|
| CN | 105337760 A | 2/2016 |
| CN | 105825040 A | 8/2016 |
| CN | 106485348 A | 3/2017 |
| CN | 106777487 A | 5/2017 |
| CN | 108052387 A | 5/2018 |
| CN | 109117595 A | 1/2019 |

\* cited by examiner

THERMAL LOAD PREDICTION METHOD AND APPARATUS, READABLE MEDIUM, AND ELECTRONIC DEVICE

CROSS REFERENCE TO THE RELATED APPLICATIONS

This application is the national stage entry of International Application No. PCT/CN2019/107928, filed on Sep. 25, 2019, which is based upon and claims priority to Chinese Patent Application No. 201811113972.6, filed on Sep. 25, 2018, the entire contents of which are incorporated herein by reference.

TECHNICAL FIELD

The present disclosure relates to the technical field of electrical engineering, and in particular, to a thermal load prediction method and apparatus, a readable medium, and an electronic device.

BACKGROUND

In order to achieve efficient scheduling of boiler steam, it is generally necessary to predict thermal loads corresponding to future time periods in which a steam user uses steam.

Currently, an autoregressive integrated moving average model (ARIMA model) is generally used to predict thermal load magnitudes respectively corresponding to future time periods in which the steam user uses boiler steam.

When the ARIMA model can predict only thermal load magnitudes corresponding to future time periods in which the steam user uses steam, a specific value is predicted. For the team user uses boiler steam irregularly in multiple continuous historical time periods, one or more predicted thermal load magnitudes may significantly differ from a current thermal load magnitude corresponding to a corresponding future time period in which the steam user actually uses boiler steam, and a single-point error occurs. As a result, boiler steam cannot be efficiently scheduled in the subsequent process.

SUMMARY

The present disclosure provides a thermal load prediction method and apparatus, a readable medium, and an electronic device, which can predict thermal load ranges respectively corresponding to future time period in which a steam user uses boiler steam and facilitate more efficient scheduling of boiler steam in the subsequent process.

In a first aspect, the present disclosure provides a thermal load prediction method, including:
configuring multiple prediction states and error thresholds respectively corresponding thereto, and forming a prediction model corresponding to a target steam user;
calling the prediction model to predict first thermal load magnitudes respectively corresponding to multiple testing time periods in which the target steam user uses boiler steam;
determining, according to the first thermal load magnitudes respectively corresponding to the testing time periods, relative prediction errors respectively corresponding to the testing time periods;
forming a state transition probability matrix according to the relative prediction errors respectively corresponding to the testing time periods and the error thresholds respectively corresponding to the prediction states, and determining a state confidence probability of each prediction state in each future time period according to the state transition probability matrix;
calling the prediction model to predict second thermal load magnitudes respectively corresponding to the future time periods in which the target steam user uses boiler steam; and
for each future time period, determining, according to the second thermal load magnitude corresponding to the future time period, the state confidence probability of each prediction state in the future time period, and the error thresholds respectively corresponding to the prediction states, a thermal load range corresponding to the future time period in which the target steam user uses boiler steam.

Preferably,
the determining, according to the first thermal load magnitudes respectively corresponding to the testing time periods, relative prediction errors respectively corresponding to the testing time periods includes:
acquiring actual thermal load magnitudes respectively corresponding to the testing time periods in which the target steam user uses boiler steam; and
calculating the relative prediction errors respectively corresponding to the testing time periods through the following formula 1:

$$E_i = \frac{F_i - f_i}{f_i} \qquad (1)$$

wherein $E_i$ represents a relative prediction error corresponding to an $i^{th}$ testing time period, $F_i$ represents an actual thermal load magnitude corresponding to the $i^{th}$ testing time period, and $f_i$ represents a first thermal load magnitude corresponding to the $i^{th}$ testing time period.

Preferably,
the forming a state transition probability matrix according to the relative prediction errors respectively corresponding to the testing time periods and the error thresholds respectively corresponding to the prediction states, and determining a state confidence probability of each prediction state in each future time period according to the state transition probability matrix includes:
determining a trusted prediction state corresponding to each testing time period according to the relative prediction errors respectively corresponding to the testing time periods and the error thresholds respectively corresponding to the prediction states;
determining the number of times of state transitions respectively corresponding to prediction state transition types according to trusted prediction states respectively corresponding to each two adjacent testing time periods;
determining a state transition probability corresponding to each state transition type according to the number of times of state transitions corresponding to each state transition type;
forming the state transition probability matrix by using the state transition probability corresponding to each state transition type;
determining an initial probability matrix of the prediction states in a current time period; and
determining confidence probabilities of the prediction states in the future time periods according to the initial probability matrix and the state transition probability matrix.

Preferably,
the determining confidence probabilities of the prediction states in the future time periods according to the initial probability matrix and the state transition probability matrix includes:
calculating the confidence probabilities of the prediction states in the future time periods through the following formula 2;

$$X(n)=X(0)*P^n \quad (2)$$

wherein $X(n)$ represents a confidence probability matrix of the prediction states in an nth future time period in which a cut-off time point of the current time period is taken as a starting time point, $X(0)$ represents an initial probability matrix corresponding to the current time period, and P represents the state transition probability matrix; and
for each future time period, extracting the confidence probabilities of the prediction states in the future time periods from a confidence probability matrix corresponding to the future time period.

Preferably,
the determining, according to the second thermal load magnitude corresponding to the future time period, the state confidence probability of each prediction state in the future time period, and the error thresholds respectively corresponding to the prediction states, a thermal load range corresponding to the future time period in which the target steam user uses boiler steam includes:
determining a maximum confidence probability from the confidence probabilities of the prediction states in the future time periods;
determining a prediction state corresponding to the maximum confidence probability as a target prediction state; and
determining, according to an error threshold corresponding to the target prediction state and the second thermal load magnitude corresponding to the future time period, the thermal load range corresponding to the future time period in which the target steam user uses boiler steam.

Preferably,
the determining, according to an error threshold corresponding to the target prediction state and the second thermal load magnitude corresponding to the future time period, the thermal load range corresponding to the future time period in which the target steam user uses boiler steam includes:
calculating an upper critical value and a lower critical value corresponding to the future time period in which the target steam user uses boiler steam through the following formula 3:

$$y=Y/(1+e) \quad (3)$$

wherein y represents the upper critical value or lower critical value corresponding to the future time period, Y represents the second thermal load magnitude corresponding to the future time period, and e represents an upper extremum or a lower extremum of the error threshold corresponding to the target prediction state; and
determining, according to the upper critical value and the lower critical value, the thermal load range corresponding to the future time period in which the target steam user uses boiler steam.

Preferably,
the multiple prediction states specifically include: an extreme overestimate state, an overestimate state, a normal state, an underestimate state, and an extreme underestimate state; wherein
an error threshold corresponding to the extreme overestimate state is specifically more than 10%;
an error threshold corresponding to the overestimate state is specifically more than 5% and no more than 10%;
an error threshold corresponding to the normal state is specifically no less than −5% and no more than 5%;
an error threshold corresponding to the underestimate state is specifically no less than −10% and less than −5%; and
an error threshold corresponding to the extreme underestimate state is specifically less than −10%.

In a second aspect, the present disclosure provides a thermal load prediction apparatus, including:
a pre-processing module configured to configure multiple prediction states and error thresholds respectively corresponding thereto, and form a prediction model corresponding to a target steam user;
a model calling module configured to call the prediction model to predict first thermal load magnitudes respectively corresponding to multiple testing time periods in which the target steam user uses boiler steam; and call the prediction model to predict second thermal load magnitudes respectively corresponding to the future time periods in which the target steam user uses boiler steam;
an error processing module configured to determine, according to the first thermal load magnitudes respectively corresponding to the testing time periods, relative prediction errors respectively corresponding to the testing time periods;
a state probability determination module configured to form a state transition probability matrix according to the relative prediction errors respectively corresponding to the testing time periods and the error thresholds respectively corresponding to the prediction states, and determine a state confidence probability of each prediction state in each future time period according to the state transition probability matrix; and
a thermal load range prediction module configured to, for each future time period, determine, according to the second thermal load magnitude corresponding to the future time period, the state confidence probability of each prediction state in the future time period, and the error thresholds respectively corresponding to the prediction states, a thermal load range corresponding to the future time period in which the target steam user uses boiler steam.

In a third aspect, the present disclosure provides a readable medium, including execution instructions, when a processor of an electronic device executes the execution instructions, the electronic device performing the method as described in the first aspect.

In a fourth aspect, the present disclosure provides an electronic device, including: a processor, a memory, and a bus; the memory being configured to store execution instructions, the processor and the memory being connected through the bus, and when the electronic device runs, the processor executing the execution instructions stored in the memory to cause the processor the perform the method as described in the first aspect.

The present disclosure provides a thermal load prediction method and apparatus, a readable medium, and an electronic device. According to the method, multiple prediction states and error thresholds respectively corresponding thereto are configured, and a prediction model corresponding to a target steam user is formed; after the prediction model is called to predict first thermal load magnitudes respectively corresponding to multiple testing time periods in which the target steam user uses boiler steam, relative prediction errors respectively corresponding to the testing time periods may be determined according to the first thermal load magnitudes respectively corresponding to the testing time periods; then a state transition probability matrix is formed according to the relative prediction errors respectively corresponding to the testing time periods, and a state confidence probability of each prediction state in each future time period is determined according to the state transition probability matrix; after the prediction model is re-called to predict second thermal load magnitudes respectively corresponding to the future time periods in which the target steam user uses boiler steam, for each future time period, a thermal load range corresponding to the future time period in which the target steam user uses boiler steam may be determined according to the second thermal load magnitude corresponding thereto, the state confidence probability of each prediction state thereof, and the error thresholds respectively corresponding to the prediction states, thereby optimizing the predicted second thermal load magnitudes without a single-point error, which can facilitate more efficient scheduling of boiler steam in the subsequent process.

BRIEF DESCRIPTION OF THE DRAWINGS

In order to more clearly illustrate technical solutions in embodiments of the present disclosure or in the existing technology, the accompanying drawings used in the embodiments or the existing technology are briefly introduced as follows. Apparently, the drawings described as follows are merely part of the embodiments of the present disclosure, other drawings can also be acquired by those skilled in the art without paying creative efforts.

DETAILED DESCRIPTION OF THE EMBODIMENTS

To make the objectives, technical solutions, and advantages of the present disclosure much clearer, the technical solutions of the present disclosure are described clearly and completely below with reference to specific embodiments and corresponding drawings. It is obvious that the embodiments to be described are only a part rather than all of the embodiments of the present disclosure. All other embodiments derived by those of ordinary skill in the art based on the embodiments of the present disclosure without paying creative efforts should fall within the protection scope of the present disclosure.

Figure 1:
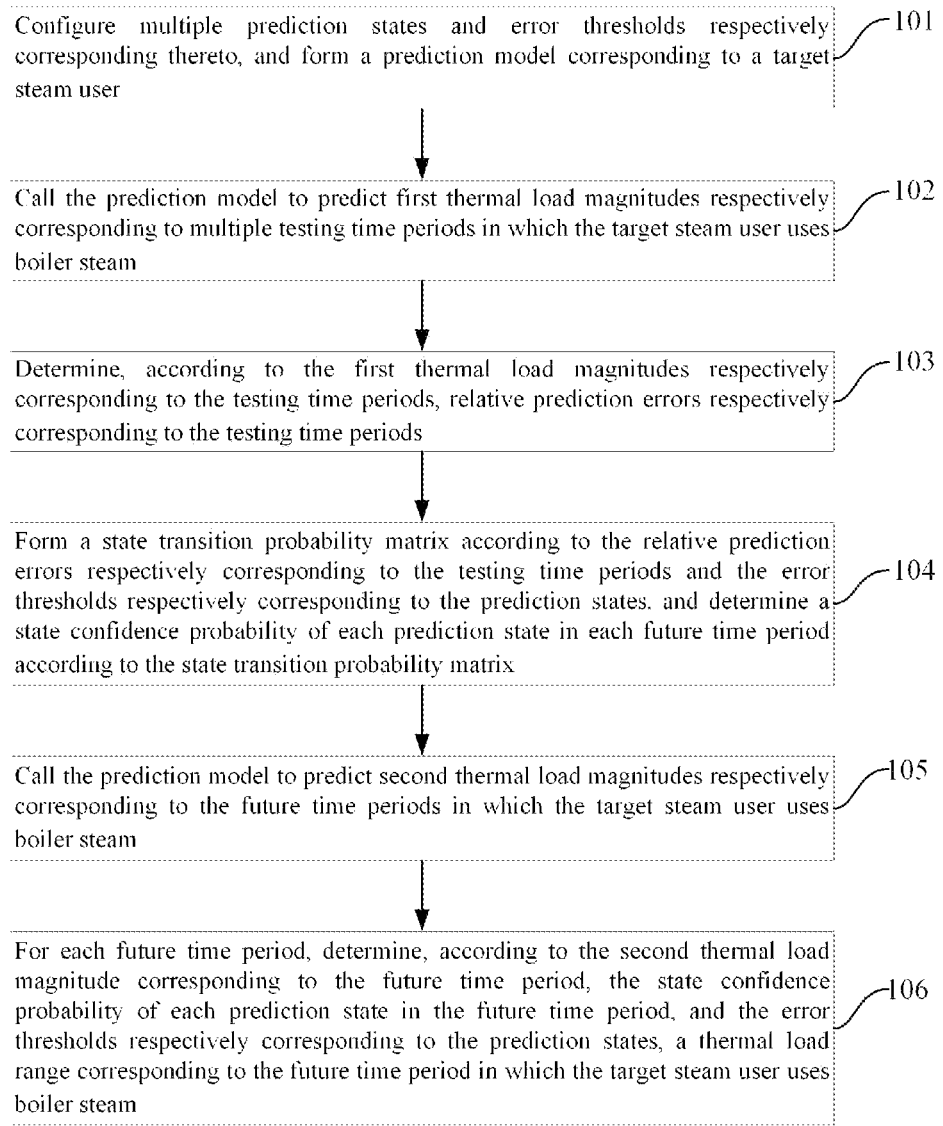
FIG. 1 is a schematic flowchart of a thermal load prediction method according to an embodiment of the present disclosure.

As shown in FIG. 1, an embodiment of the present disclosure provides a thermal load prediction method, including the following steps.

Step 101: Configure multiple prediction states and error thresholds respectively corresponding thereto, and form a prediction model corresponding to a target steam user.

Step 102: Call the prediction model to predict first thermal load magnitudes respectively corresponding to multiple testing time periods in which the target steam user uses boiler steam.

Step 103: Determine, according to the first thermal load magnitudes respectively corresponding to the testing time periods, relative prediction errors respectively corresponding to the testing time periods.

Step 104: Form a state transition probability matrix according to the relative prediction errors respectively corresponding to the testing time periods and the error thresholds respectively corresponding to the prediction states, and determine a state confidence probability of each prediction state in each future time period according to the state transition probability matrix.

Step 105: Call the prediction model to predict second thermal load magnitudes respectively corresponding to the future time periods in which the target steam user uses boiler steam.

Step 106: For each future time period, determine, according to the second thermal load magnitude corresponding to the future time period, the state confidence probability of each prediction state in the future time period, and the error thresholds respectively corresponding to the prediction states, a thermal load range corresponding to the future time period in which the target steam user uses boiler steam.

In the embodiment as shown in FIG. 1, according to the method, multiple prediction states and error thresholds respectively corresponding thereto are configured, and a prediction model corresponding to a target steam user is formed; after the prediction model is called to predict first thermal load magnitudes respectively corresponding to multiple testing time periods in which the target steam user uses boiler steam, relative prediction errors respectively corresponding to the testing time periods may be determined according to the first thermal load magnitudes respectively corresponding to the testing time periods; then a state transition probability matrix is formed according to the relative prediction errors respectively corresponding to the testing time periods, and a state confidence probability of each prediction state in each future time period is determined according to the state transition probability matrix; after the prediction model is re-called to predict second thermal load magnitudes respectively corresponding to the future time periods in which the target steam user uses boiler steam, for each future time period, a thermal load range corresponding to the future time period in which the target steam user uses boiler steam may be determined according to the second thermal load magnitude corresponding thereto, the state confidence probability of each prediction state thereof, and the error thresholds respectively corresponding to the prediction states, thereby optimizing the predicted second thermal load magnitudes without a single-point error, which can facilitate more efficient scheduling of boiler steam in the subsequent process.

The prediction model may specifically be an ARIMA model or a gradient boost regression tree (GBRT) prediction model. Both the ARIMA model and the GBRT prediction model need to be formed based on actual thermal load magnitudes respectively corresponding to multiple continuous historical time periods in which a target steam user uses boiler steam.

It needs to be noted that "historical time period", "testing time period", and "future time period" described in any part of the embodiments of the present disclosure all have the same time length, which may specifically be one hour. It is obvious that in some special service scenarios, the time length of the time periods may also be set to other values.

In a preferred embodiment of the present disclosure, the multiple prediction states specifically include: an extreme overestimate state, an overestimate state, a normal state, an underestimate state, and an extreme underestimate state; wherein an error threshold corresponding to the extreme overestimate state is specifically more than 10%;

an error threshold corresponding to the overestimate state is specifically more than 5% and no more than 10%;

an error threshold corresponding to the normal state is specifically no less than −5% and no more than 5%;

an error threshold corresponding to the underestimate state is specifically no less than −10% and less than −5%; and an error threshold corresponding to the extreme underestimate state is specifically less than −10%.

The multiple prediction states set in the embodiment may be increased or decreased by the user in combination with different requirements of actual service scenarios. The prediction states are respectively configured with different error thresholds. Upon verification by a limited number of experiments, when the error thresholds respectively corresponding to the prediction states are the threshold in the foregoing embodiment, it may ensure that actual thermal load magnitudes respectively corresponding to the future time periods in which the target steam user uses boiler steam are within the corresponding thermal load ranges predicted through the technical solution provided in the embodiment of the present disclosure. That is, this ensures that the technical solution provided in the embodiment of the present disclosure can more accurately predict thermal load magnitudes respectively corresponding to future time periods in which a target steam user uses boiler steam.

For ease of description, in subsequent embodiments of the present disclosure, only S1 is used to represent an extreme overestimate state, S2 is used to represent an overestimate state, S3 is used to represent a normal state, S4 is used to represent an underestimate state, and S5 is used to represent an extreme underestimate state.

In a preferred embodiment of the present disclosure, the determining, according to the first thermal load magnitudes respectively corresponding to the testing time periods, relative prediction errors respectively corresponding to the testing time periods includes:

acquiring actual thermal load magnitudes respectively corresponding to the testing time periods in which the target steam user uses boiler steam; and calculating the relative prediction errors respectively corresponding to the testing time periods through the following formula 1:

$$E_i = \frac{F_i - f_i}{f_i} \quad (1)$$

wherein $E_i$ represents a relative prediction error corresponding to an $i^{th}$ testing time period, $F_i$ represents an actual thermal load magnitude corresponding to the $i^{th}$ testing time period, and $f_i$ represents a first thermal load magnitude corresponding to the $i^{th}$ testing time period.

In the embodiment, first thermal load magnitudes respectively corresponding to the testing time periods in which the target steam user uses boiler steam are predicted through the prediction module. After the actual thermal load magnitudes respectively corresponding to the testing time periods in which the target steam user uses boiler steam are acquired, the first thermal load magnitudes and the actual thermal load magnitudes respectively corresponding to the testing time periods are further processed through the formula 1. Each relative prediction error obtained can be used to evaluate a prediction state between the predicted first thermal load magnitude and the actual thermal load magnitude corresponding to a corresponding testing time period, and an error magnitude of the first thermal load magnitude corresponding to the corresponding testing time period is measured.

In a preferred embodiment of the present disclosure, the forming a state transition probability matrix according to the relative prediction errors respectively corresponding to the testing time periods and the error thresholds respectively corresponding to the prediction states, and determining a state confidence probability of each prediction state in each future time period according to the state transition probability matrix includes:

determining a trusted prediction state corresponding to each testing time period according to the relative prediction errors respectively corresponding to the testing time periods and the error thresholds respectively corresponding to the prediction states;

determining the number of times of state transitions respectively corresponding to prediction state transition types according to trusted prediction states respectively corresponding to each two adjacent testing time periods;

determining a state transition probability corresponding to each state transition type according to the number of times of state transitions corresponding to each state transition type;

forming the state transition probability matrix by using the state transition probability corresponding to each state transition type;

determining an initial probability matrix of the prediction states in a current time period; and determining confidence probabilities of the prediction states in the future time periods according to the initial probability matrix and the state transition probability matrix.

For example, if the relative prediction error $E_i$ corresponding to the $i^{th}$ testing time period is calculated through the formula 1 is 6%, it may be determined according to the error thresholds respectively corresponding to the prediction states S1, S2, S3, S4, and S5 in the foregoing embodiment that 6% is within the error threshold corresponding to the overestimate state S2, and then the overestimate state S2 may be determined as a trusted prediction state corresponding to the $i^{th}$ testing time period.

In the embodiment, the prediction state transition type specifically refers to a situation in which one of the multiple prediction states transits to a current prediction state or other prediction states. Specifically, taking the five prediction states S1, S2, S3, S4, and S5 in the foregoing embodiment as an example, S1 corresponds to the following five transitions: transition from S1 to S1, transition from S1 to S2, transition from S1 to S, transition from S1 to S4, and transition from S4 to S5. Based on the similar principle, S2, S3, S4, and S5 also corresponding to five transitions respectively. Each transition is a prediction state transition type. Then, there may be 25 prediction state transition types here.

In this embodiment, taking n continuous testing time periods as an example, if a trusted prediction state corresponding to an $i-1^{th}$ testing time period is S1, a trusted prediction state corresponding to an $i^{th}$ testing time period is S2, and the number of times of state transitions corresponding to the prediction state transition type of the transition from S1 to S2 is increased by 1. After the foregoing process is performed for each two adjacent testing time periods, the number of times of state transitions respectively corresponding to the prediction state transition types may be obtained. Further, for a state transition type, a ratio of the number of times of state transitions corresponding thereto to the total number n of the testing time periods is a state transition probability P corresponding to the state transition type.

Specifically, positions of the state transition probabilities respectively corresponding to the state transition types in the formed state transition probability matrix may be obtained with reference to Table 1 below:

TABLE 1

| $P_{S1-S1}$ | $P_{S1-S2}$ | $P_{S1-S3}$ | $P_{S1-S4}$ | $P_{S1-S5}$ |
|---|---|---|---|---|
| $P_{S2-S1}$ | $P_{S2-S2}$ | $P_{S2-S3}$ | $P_{S2-S4}$ | $P_{S2-S5}$ |
| $P_{S3-S1}$ | $P_{S3-S2}$ | $P_{S3-S3}$ | $P_{S3-S4}$ | $P_{S3-S5}$ |
| $P_{S4-S1}$ | $P_{S4-S2}$ | $P_{S4-S3}$ | $P_{S4-S4}$ | $P_{S4-S5}$ |
| $P_{S5-S1}$ | $P_{S5-S2}$ | $P_{S5-S3}$ | $P_{S5-S4}$ | $P_{S5-S5}$ |

It should be noted that the state transition probability $P_{S1-S2}$ in Table 1 specifically represents a state transition probability corresponding to the state transition type "transition from S1 to S2", and a person skilled in the art can understand the state transition probabilities in Table 1 according to similar rules.

It should also be noted that a row-column position corresponding to each state transition probability in Table 1 is, when the state transition probability serves as an element in the state transition probability matrix, a row-column position corresponding to the element in the state transition probability.

In the embodiment, a trusted prediction state corresponding to a current time period may be determined with a similar method when an initial probability matrix of the prediction states in the current time period is determined. The initial probability matrix has 5 elements, which are initial probabilities of the prediction states S1, S2, S3, S4, and S5 sequentially. Moreover, only the initial probability of the trusted prediction state corresponding to the current time period is 1, and the initial probabilities of the other prediction states are all 0.

In the embodiment, when confidence probabilities of the prediction states in the future time periods are determined according to the initial probability matrix and the state transition probability matrix, for one future time period, a higher confidence probability of a current prediction state in the future time period indicates a higher probability that a prediction state corresponding to a second thermal load magnitude is a current prediction state when the formed prediction model is called to predict the corresponding second thermal load magnitude in the future time period in which the target steam user uses boiler steam, so as to facilitate optimization of the corresponding second thermal load magnitude in the future time period predicted by the prediction model according to the confidence probabilities of the prediction states in the future time period, thereby more accurately determining a corresponding thermal load range in the future time period when the target steam user uses boiler steam.

Specifically, in an embodiment of the present disclosure, the determining confidence probabilities of the prediction states in the future time periods according to the initial probability matrix and the state transition probability matrix includes:
calculating the confidence probabilities of the prediction states in the future time periods through the following formula 2;

$$X(n)=X(0)*P^n \quad (2)$$

wherein X(n) represents a confidence probability matrix of the prediction states in an nth future time period in which a cut-off time point of the current time period is taken as a starting time point, X(0) represents an initial probability matrix corresponding to the current time period, and P represents the state transition probability matrix; and
for each future time period, extracting the confidence probabilities of the prediction states in the future time periods from a confidence probability matrix corresponding to the future time period.

In a confidence probability matrix corresponding to an $n^{th}$ time period obtained through the foregoing formula 2, taking that the multiple prediction states in the foregoing embodiment specifically include S1, S2, S3, S4, and S5 as an example, the confidence probability matrix may include 5 elements, which are sequentially confidence probabilities relative to the prediction states S1, S2, S3, S4, and S5 in an $n^{th}$ future time period.

In a preferred embodiment of the present disclosure, the determining, according to the second thermal load magnitude corresponding to the future time period, the state confidence probability of each prediction state in the future time period, and the error thresholds respectively corresponding to the prediction states, a thermal load range corresponding to the future time period in which the target steam user uses boiler steam includes:
determining a maximum confidence probability from the confidence probabilities of the prediction states in the future time periods;
determining a prediction state corresponding to the maximum confidence probability as a target prediction state; and
determining, according to an error threshold corresponding to the target prediction state and the second thermal load magnitude corresponding to the future time period, the thermal load range corresponding to the future time period in which the target steam user uses boiler steam.

Specifically, in a preferred embodiment of the present disclosure, the determining, according to an error threshold corresponding to the target prediction state and the second thermal load magnitude corresponding to the future time period, the thermal load range corresponding to the future time period in which the target steam user uses boiler steam includes:
calculating an upper critical value and a lower critical value corresponding to the future time period in which the target steam user uses boiler steam through the following formula 3:

$$y=Y/(1+e) \quad (3)$$

wherein y represents the upper critical value or lower critical value corresponding to the future time period, Y represents the second thermal load magnitude corresponding to the future time period, and e represents an upper extremum or a lower extremum of the error threshold corresponding to the target prediction state; and determining, according to the upper critical value and the lower critical value, the thermal load range corresponding to the future time period in which the target steam user uses boiler steam.

In the embodiment, if a confidence probability relative to a current prediction state in a future time period is higher, it indicates that when the prediction model is called to predict a corresponding second thermal load magnitude in the future timer period when the target steam user uses boiler steam, a probability that a prediction state corresponding to the predicted second thermal load magnitude is the current prediction state is higher. Therefore, after a prediction state corresponding to a maximum confidence probability is determined as a target state, the predicted second thermal load magnitude is optimized through the foregoing formula 3 according to the error threshold corresponding to the target prediction state, and then a thermal load range corresponding to the future time period in which the target steam user uses boiler steam can be more accurately determined.

For example, if it is determined that a confidence probability corresponding to the prediction state S2 is the highest in state confidence probabilities relative to the prediction states S1, S2, S3, S4, and S5 in a $j^{th}$ future time period, it indicates that, when a corresponding second thermal load magnitude in the $j^{th}$ future time period in which the target steam user uses boiler steam is predicted through the prediction model, a probability that the predicted second thermal load magnitude corresponds to an overestimated state is higher. Specifically, referring to the foregoing embodiment, the error threshold corresponding to the prediction state S2 is more than 5% and no more than 10%, that is, an upper extremum (a maximum value or a limit value to which the maximum value approximates) corresponding to the overestimate state S2 is 10% and a lower extremum (a minimum value or a limit value to which the minimum value approximates) is 5%, and the second thermal load magnitude corresponding to the $j^{th}$ future time period predicted by the prediction model is Y (a probability of the predicted Y value being overestimated is extremely high); then, it may be calculated through the foregoing formula 3 that an upper critical value corresponding to the $i^{th}$ future time period is 0.95Y and a lower critical value is 0.91Y, and then it is determined that a thermal load range corresponding to the $i^{th}$ future time period in which the user uses boiler steam is 0.91Y to 0.95Y.

Based on the foregoing example, when the steam is scheduled in the subsequent process, if steam scheduling is performed for the target steam user in the $i^{th}$ future time period according to the second thermal load magnitude Y predicted by the prediction model, an excessive difference between supply and demand may occur at the target steam user. On the contrary, steam scheduling is performed for the target steam user in the $i^{th}$ future time period according to the thermal load range of 0.91Y to 0.95Y, it represents that the lowest thermal load demand of the target steam user may be 0.91Y and the highest thermal load demand may be 0.95Y. In this case, steam scheduling may be performed for the target steam user with the lowest thermal load demand, the highest thermal load demand, or an intermediate thermal load demand value of the target steam user in combination with an actual service scenario. It is not difficult to see that the technical solution provided in the embodiment of the present disclosure can overcome an excessive single-point error caused by directly predicting, through a prediction model, a thermal load magnitude corresponding to a future time period in which a user uses boiler steam, which can facilitate the more efficient scheduling of boiler steam in the subsequent process.

Figure 2:
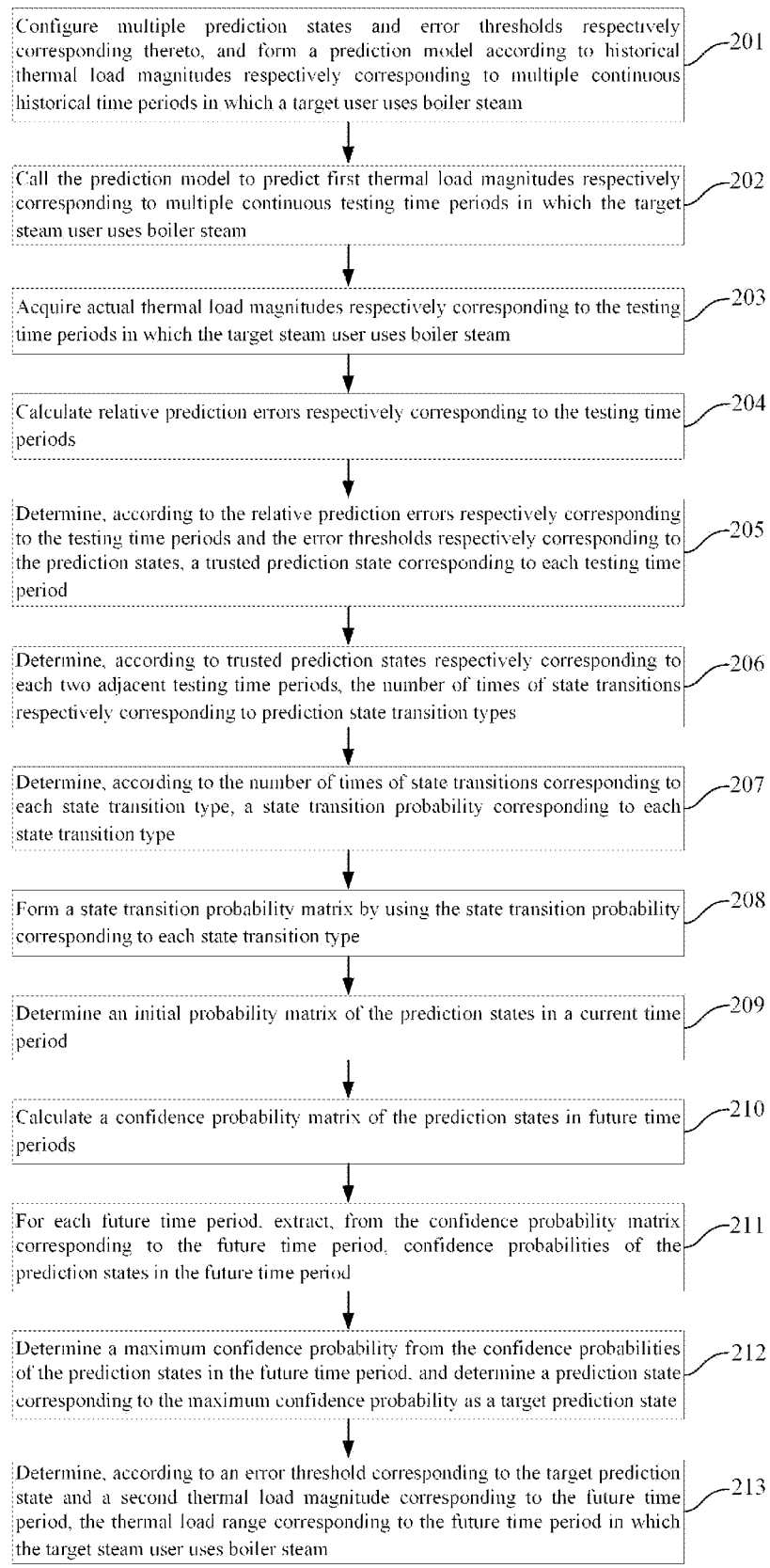
FIG. 2 is a schematic flowchart of another thermal load prediction method according to an embodiment of the present disclosure.

Referring to FIG. 2, an embodiment of the present disclosure provides another thermal load prediction method, which specifically includes the following steps.

Step 201. Configure multiple prediction states and error thresholds respectively corresponding thereto, and form a prediction model according to historical thermal load magnitudes respectively corresponding to multiple continuous historical time periods in which a target user uses boiler steam.

Step 202. Call the prediction model to predict first thermal load magnitudes respectively corresponding to multiple continuous testing time periods in which the target steam user uses boiler steam.

Step 203. Acquire actual thermal load magnitudes respectively corresponding to the testing time periods in which the target steam user uses boiler steam.

Step 204. Calculate relative prediction errors respectively corresponding to the testing time periods.

Step 204 may be specifically implemented in combination with the formula 1 provided in any embodiment of the present disclosure.

Step 205. Determine, according to the relative prediction errors respectively corresponding to the testing time periods and the error thresholds respectively corresponding to the prediction states, a trusted prediction state corresponding to each testing time period.

Step 206. Determine, according to trusted prediction states respectively corresponding to each two adjacent testing time periods, the number of times of state transitions respectively corresponding to prediction state transition types.

Step 207. Determine, according to the number of times of state transitions corresponding to each state transition type, a state transition probability corresponding to each state transition type.

Step 208. Form a state transition probability matrix by using the state transition probability corresponding to each state transition type.

Step 209. Determine an initial probability matrix of the prediction states in a current time period.

Step 210. Calculate a confidence probability matrix of the prediction states in future time periods.

Step 210 may be specifically implemented in combination with the formula 2 provided in any embodiment of the present disclosure.

Step 211. For each future time period, extract, from the confidence probability matrix corresponding to the future time period, confidence probabilities of the prediction states in the future time period.

For ease of description, corresponding processing is performed only for one future time period in subsequent steps to determine a thermal load range corresponding to the future time period in which the target steam user uses boiler steam.

Step 212. Determine a maximum confidence probability from the confidence probabilities of the prediction states in the future time period, and determine a prediction state corresponding to the maximum confidence probability as a target prediction state.

Step 213. Determine, according to an error threshold corresponding to the target prediction state and a second thermal load magnitude corresponding to the future time period, the thermal load range corresponding to the future time period in which the target steam user uses boiler steam.

Here, the thermal load range corresponding to the future time period in which the target steam user uses boiler steam can be determined specifically in combination with the formula 3 provided in any of the foregoing embodiments.

Figure 3:
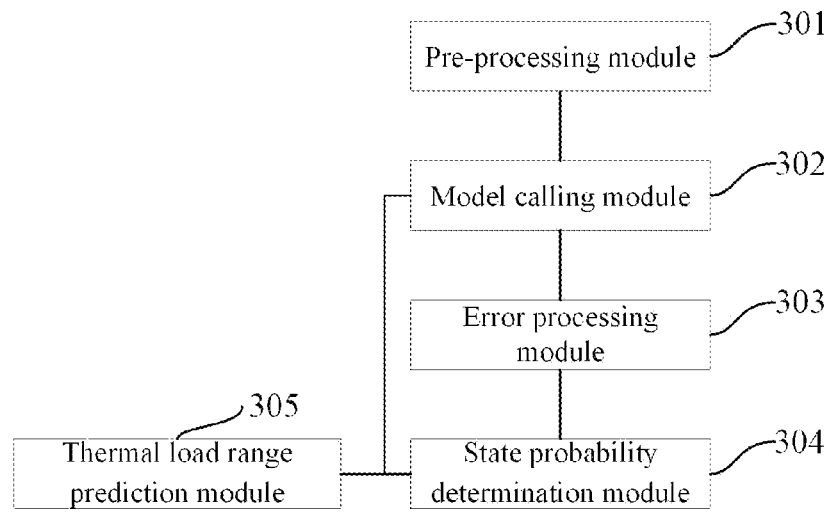
FIG. 3 is a schematic structural diagram of a thermal load prediction apparatus according to an embodiment of the present disclosure.

Based on the same concept as the method embodiment of the present disclosure, as shown in FIG. 3, an embodiment of the present disclosure further provides a thermal load prediction apparatus, including:

a pre-processing module 301 configured to configure multiple prediction states and error thresholds respectively corresponding thereto, and form a prediction model corresponding to a target steam user;

a model calling module 302 configured to call the prediction model to predict first thermal load magnitudes respectively corresponding to multiple testing time periods in which the target steam user uses boiler steam; and call the prediction model to predict second thermal load magnitudes respectively corresponding to the future time periods in which the target steam user uses boiler steam;

an error processing module 303 configured to determine, according to the first thermal load magnitudes respectively corresponding to the testing time periods, relative prediction errors respectively corresponding to the testing time periods;

a state probability determination module 304 configured to form a state transition probability matrix according to the relative prediction errors respectively corresponding to the testing time periods and the error thresholds respectively corresponding to the prediction states, and determine a state confidence probability of each prediction state in each future time period according to the state transition probability matrix; and a thermal load range prediction module 305 configured to, for each future time period, determine, according to the second thermal load magnitude corresponding to the future time period, the state confidence probability of each prediction state in the future time period, and the error thresholds respectively corresponding to the prediction states, a thermal load range corresponding to the future time period in which the target steam user uses boiler steam.

Figure 4:
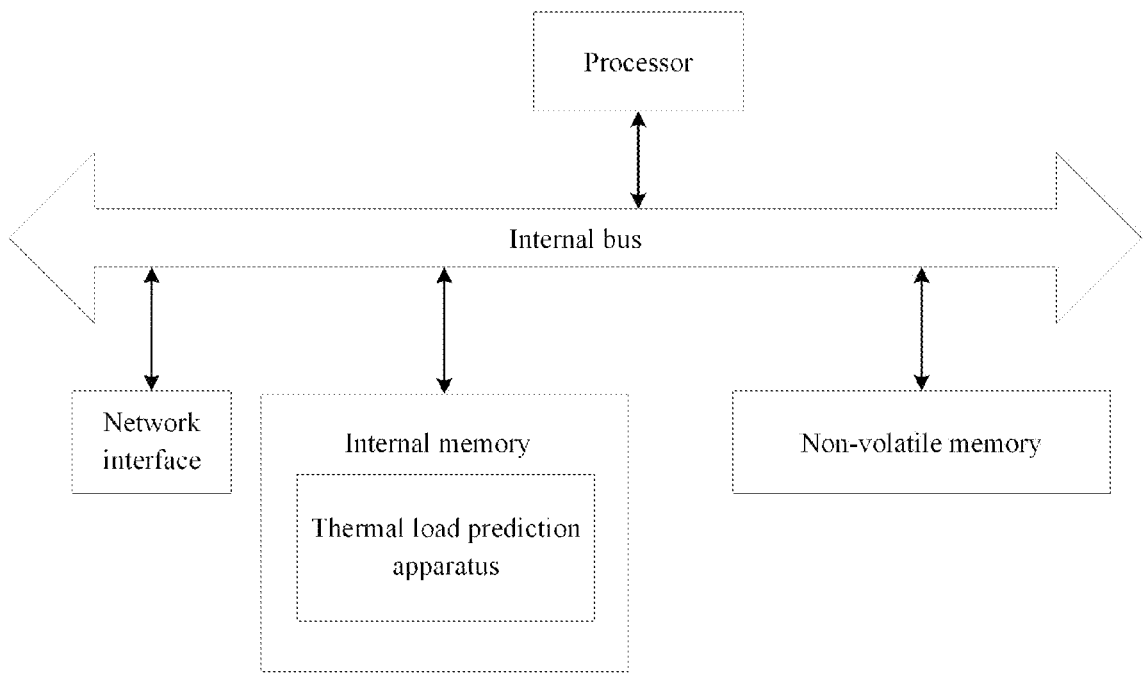
FIG. 4 is a schematic structural diagram of an electronic device according to an embodiment of the present disclosure.

FIG. 4 is a schematic structural diagram of an electronic device according to an embodiment of the present disclosure. At a hardware level, the electronic device includes a processor and optionally further includes an internal bus, a network interface, and a memory. The memory may include an internal memory, for example, a high-speed random-access memory (RAM), and may further include a non-volatile memory, for example, at least one disk memory. Certainly, the electronic device may further include hardware required by the services.

The processor, the network interface, and the memory may be interconnected through the internal bus. The internal bus may be an industry standard architecture (ISA) bus, a peripheral component interconnect (PIC) bus, an extended industry standard architecture (EISA) bus, or the like. The bus may be divided to an address bus, a data bus, a control bus, and the like. For ease of representation, the bus is represented with only a two-way arrow in FIG. 4, and this does not mean that there is only one bus or one type of buses.

The memory is used to programs/execution instructions. Specifically, the programs may include program code, and the program code includes computer operation instructions.

The memory may include an internal memory and a non-volatile memory, and provide instructions and data for the processor.

In one possible implementation manner, the processor reads, from the non-volatile memory, a corresponding computer program to the internal memory and then runs the computer program, or may acquire a corresponding computer program from other devices, to form a thermal load prediction apparatus at a logic level. The processor executes the programs stored in the memory to implement the thermal load prediction method provided in any embodiment of the present disclosure through the executed program.

The method performed by the thermal load prediction apparatus provided in the foregoing embodiment is applicable to a processor or implemented by a processor. The processor may be an integrated circuit chip with a signal processing capability. During the implementation, steps of the above method may be completed by an integrated logic circuit of hardware in the processor or by instructions in the form of software. The processor may be a general-purpose processor, including a central processing unit (CPU), a network processor (NP), and the like; and may further be a digital signal processor (DSP), an application specific integrated circuit (ASIC), a field-programmable gate array (FPGA) or other programmable logic devices, a discrete gate or transistor logic device, or a discrete hardware component the methods, steps, and logical block diagrams disclosed in the embodiments of the present disclosure can be implemented or performed. The general-purpose processor may be a micro-processor or the processor may also be any conventional processor or the like.

The steps of the method disclosed in combination with the embodiments of the present disclosure may be directly completed by a hardware decoding processor, or be completed by a combination of hardware and software modules in a decoding processor. The software module may be located in a mature storage medium in the art such as a RANI, a flash memory, a ROM, a programmable ROM, an electrically erasable programmable memory, and a register. The storage medium is located in the memory. The processor reads information in the memory, and completes the steps of the method in combination with the hardware thereof.

An embodiment of the present disclosure further provides a computer-readable memory medium storing one or more programs, the one or more programs including instructions, and the instructions, when executed by an electronic device including multiple applications, enabling the electronic device to perform the thermal load prediction method provided in any embodiment of the present disclosure, and being specifically used to perform the method shown in FIG. 1 and/or FIG. 2.

The system, apparatus, modules or units illustrated in the foregoing embodiments specifically can be implemented by a computer chip or an entity, or implemented by a product having a specific function. A typical implementation device is a computer. Specifically, the computer can be, for example, a personal computer, a laptop computer, a cellular phone, a camera phone, a smart phone, a personal digital assistant, a media player, a navigation device, an email device, a game console, a tablet computer, a wearable device, or a combination of any of these devices.

For ease of description, the apparatus is divided into various units or modules based on functions, and the units or modules are described separately. Definitely, in an implementation of the present disclosure, functions of various units or modules can be implemented in one or more pieces of software and/or hardware.

A person skilled in the art should understand that the embodiments of the present disclosure can be provided as a method, a system, or a computer program product. Therefore, the present disclosure may be implemented in the form of a complete hardware embodiment, a complete software embodiment, or an embodiment combining software and hardware. Moreover, the present disclosure can be in the form of a computer program product implemented on one or more computer usable storage media (including, but not limited to, a magnetic disk memory, a CD-ROM, an optical memory and the like) including computer usable program codes.

The present disclosure is described with reference to flowcharts and/or block diagrams of the method, the device (system), and the computer program product according to the embodiments of the present disclosure. It should be understood that a computer program instruction may be used to implement each process and/or block in the flowcharts and/or block diagrams and combinations of processes and/or blocks in the flowcharts and/or block diagrams. The computer program instructions may be provided to a general-purpose computer, a special-purpose computer, an embedded processor or a processor of another programmable data processing device to generate a machine, such that the computer or the processor of another programmable data processing device executes an instruction to generate an apparatus configured to implement functions designated in one or more processes in a flowchart and/or one or more blocks in a block diagram.

The computer program instructions may also be stored in a computer-readable memory that can guide the computer or another programmable data processing device to work in a specific manner, such that the instruction stored in the computer-readable memory generates an article of manufacture including an instruction apparatus, and the instruction apparatus implements functions designated by one or more processes in a flowchart and/or one or more blocks in a block diagram.

The computer program instructions may also be installed in the computer or another programmable data processing device, such that a series of operation steps are executed on the computer or another programmable device to generate a computer implemented processing, and therefore, the instruction executed in the computer or another programmable device provides steps for implementing functions designated in one or more processes in a flowchart and/or one or more blocks in a block diagram.

In a typical configuration, a computing device includes one or more central processing units (CPUs), an input/output interface, a network interface, and an internal memory.

The internal memory may include computer-readable media such as a volatile memory, a RAM, and/or a non-volatile internal memory, e.g., a ROM or a flash RAM. The memory is an example of a computer-readable medium. The internal memory is an example of the computer-readable medium.

The computer-readable medium includes non-volatile and volatile media as well as removable and non-removable media, and can implement information storage by means of any method or technology. The information can be a computer-readable instruction, a data structure, and a module of a program or other data. An example of the storage medium of a computer includes, but is not limited to, a phase change memory (PRAM), a static random access memory (SRAM), a dynamic random access memory (DRAM), other types of RAMS, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission media, and can be used to store information accessible to the computing device. According to the definition in this text, the computer-readable medium does not include transitory media, such as a modulated data signal and a carrier.

It should be further noted that the terms "include", "comprise", or any other variations thereof are intended to cover non-exclusive inclusion, so that a process, method, commodity or device including a series of elements not only includes the elements clearly listed, but also can includes other elements not clearly listed or elements inherent to the process, method, commodity or device. In the absence of more restrictions, an element defined by "including a/an . . . " does not exclude that the process, method, commodity or device including the element further has other identical elements.

A person skilled in the art should understand that the embodiments of the present disclosure can be provided as a method, a system, or a computer program product. Therefore, the present disclosure may be implemented in the form of a complete hardware embodiment, a complete software embodiment, or an embodiment combining software and hardware. Moreover, the present disclosure can be in the form of a computer program product implemented on one or more computer usable storage media (including, but not limited to, a magnetic disk memory, a CD-ROM, an optical memory and the like) including computer usable program codes.

The present disclosure may be described in a common context of computer-executable instructions executed by a computer, for example, a program module. Generally, the program module includes a routine, a program, an object, an assembly, a data structure, and the like for executing a specific task or implementing a specific abstract data type. The present disclosure may also be practiced in distributed computing environments, and in the distributed computing environments, a task is executed by using remote processing devices connected through a communications network. In the distributed computing environments, the program module may be located in local and remote computer storage media including a storage device.

The embodiments of the present disclosure are all described in a progressive manner, identical or similar parts in the embodiments may be obtained with reference to each other, and each embodiment emphasizes a difference between it and other embodiments. Especially, the system embodiment is basically similar to the method embodiment, so that it is described simply. For related parts, refer to the descriptions of the parts in the method embodiment.

The above description is merely embodiments of the present disclosure, and is not intended to limit the present disclosure. For a person skilled in the art, the present disclosure can have various alterations and changes. Any modification, equivalent replacement, improvement and the like made without departing from the spirit and principle of the present disclosure should be included in the scope of the claims of the present disclosure.

What is claimed is:

1. A thermal load prediction method for facilitate efficient scheduling of boiler steam usage, comprising:
configuring a plurality of prediction states and error thresholds respectively corresponding to the plurality of prediction states, and forming a prediction model corresponding to a target steam user;

calling the prediction model to predict first thermal load magnitudes respectively corresponding to a plurality of testing time periods, wherein the target steam user uses boiler steam in the plurality of testing time periods;

determining, according to the first thermal load magnitudes respectively corresponding to the plurality of testing time periods, relative prediction errors respectively corresponding to the plurality of testing time periods;

forming a state transition probability matrix according to the relative prediction errors respectively corresponding to the plurality of testing time periods and the error thresholds respectively corresponding to the plurality of prediction states, and determining a state confidence probability of each prediction state of the plurality of prediction states in each future time period of future time periods according to the state transition probability matrix;

calling the prediction model to predict second thermal load magnitudes respectively corresponding to the future time periods, wherein the target steam user uses the boiler steam in the future time periods; and for the each future time period, determining a thermal load range corresponding to the each future time period, according to each second thermal load magnitude of the second thermal load magnitudes corresponding to the each future time period, the state confidence probability of the each prediction state in the each future time period, and the error thresholds respectively corresponding to the plurality of prediction states, wherein the target steam user uses the boiler steam in the each future time period; and scheduling the operation of the boiler steam according to the thermal load range with minimum difference between supply and demand of the target steam user.

2. The method according to claim 1, wherein
the step of determining, according to the first thermal load magnitudes respectively corresponding to the plurality of testing time periods, the relative prediction errors respectively corresponding to the plurality of testing time periods comprises:

acquiring actual thermal load magnitudes respectively corresponding to the plurality of testing time periods, wherein the target steam user uses the boiler steam in the plurality of testing time periods; and calculating the relative prediction errors respectively corresponding to the plurality of testing time periods through the following formula (1):

$$E_i = \frac{F_i - f_i}{f_i}; \tag{1}$$

wherein $E_i$ represents a relative prediction error of the relative prediction errors corresponding to an $i^{th}$ testing time period of the plurality of testing time periods, $F_i$ represents an actual thermal load magnitude of the actual thermal load magnitudes corresponding to the $i^{th}$ testing time period of the plurality of testing time periods, and $f_i$ represents a first thermal load magnitude of the first thermal load magnitudes corresponding to the $i^{th}$ testing time period of the plurality of testing time periods.

3. The method according to claim 2, wherein
the step of forming the state transition probability matrix according to the relative prediction errors respectively corresponding to the plurality of testing time periods and the error thresholds respectively corresponding to the plurality of prediction states, and the step of determining the state confidence probability of the each prediction state in the each future time period according to the state transition probability matrix comprises:

determining a trusted prediction state of trusted prediction states corresponding to each testing time period of the plurality of testing time periods according to the relative prediction errors respectively corresponding to the plurality of testing time periods and the error thresholds respectively corresponding to the plurality of prediction states;

determining a number of times of state transitions respectively corresponding to prediction state transition types according to the trusted prediction states respectively corresponding to each two adjacent testing time periods of the plurality of testing time periods;

determining a state transition probability corresponding to each prediction state transition type of the prediction state transition types according to the number of times of the state transitions corresponding to the each prediction state transition type;

forming the state transition probability matrix by using the state transition probability corresponding to the each prediction state transition type;

determining an initial probability matrix of the plurality of prediction states in a current time period; and determining confidence probabilities of the plurality of prediction states in the future time periods according to the initial probability matrix and the state transition probability matrix.

4. The method according to claim 3, wherein
the step of determining the confidence probabilities of the plurality of prediction states in the future time periods according to the initial probability matrix and the state transition probability matrix comprises:

calculating the confidence probabilities of the plurality of prediction states in the future time periods through the following formula (2);

$$X(n)=X(0)*P^n \tag{2};$$

wherein $X(n)$ represents a confidence probability matrix of the plurality of prediction states in an [$n^{th}$ future time period of the future time periods, wherein a cut-off time point of the current time period is taken as a starting time point in the $n^{th}$ future time period, $X(0)$ represents the initial probability matrix corresponding to the current time period, and P represents the state transition probability matrix; and for the each future time period, extracting the confidence probabilities of the plurality of prediction states in the future time periods from the confidence probability matrix corresponding to the each future time period.

5. The method according to claim 4, wherein
the plurality of prediction states comprise: an extreme overestimate state, an overestimate state, a normal state, an underestimate state, and an extreme underestimate state; wherein a first error threshold corresponding to the extreme overestimate state is more than 10%;

a second error threshold corresponding to the overestimate state is more than 5% and less than or equal to 10%;

a third error threshold corresponding to the normal state is more than −5% and less than or equal to 5%;

a fourth error threshold corresponding to the underestimate state is more than or equal to −10% and less than −5%; and a fifth error threshold corresponding to the extreme underestimate state is less than −10%.

6. The method according to claim 3, wherein the plurality of prediction states comprise: an extreme overestimate state, an overestimate state, a normal state, an underestimate state, and an extreme underestimate state; wherein a first error threshold corresponding to the extreme overestimate state is more than 10%;

a second error threshold corresponding to the overestimate state is more than 5% and less than or equal to 10%;

a third error threshold corresponding to the normal state is more than −5% and less than or equal to 5%;

a fourth error threshold corresponding to the underestimate state is more than or equal to −10% and less than −5%; and a fifth error threshold corresponding to the extreme underestimate state is less than −10%.

7. The method according to claim 2, wherein the plurality of prediction states comprise: an extreme overestimate state, an overestimate state, a normal state, an underestimate state, and an extreme underestimate state; wherein a first error threshold corresponding to the extreme overestimate state is more than 10%;

a second error threshold corresponding to the overestimate state is more than 5% and less than or equal to 10%;

a third error threshold corresponding to the normal state is more than −5% and less than or equal to 5%;

a fourth error threshold corresponding to the underestimate state is more than or equal to −10% and less than −5%; and a fifth error threshold corresponding to the extreme underestimate state is less than −10%.

8. The method according to claim 1, wherein the step of determining, according to the each second thermal load magnitude corresponding to the each future time period, the state confidence probability of the each prediction state in the each future time period, and the error thresholds respectively corresponding to the plurality of prediction states, the thermal load range corresponding to the each future time period, wherein the target steam user uses the boiler steam in the each future time period comprises:

determining a maximum confidence probability from confidence probabilities of the plurality of prediction states in the future time periods;

determining a prediction state of the plurality of prediction states corresponding to the maximum confidence probability as a target prediction state; and determining, according to an error threshold of the error thresholds corresponding to the target prediction state and the each second thermal load magnitude corresponding to the each future time period, the thermal load range corresponding to the each future time period, wherein the target steam user uses the boiler steam in the each future time period.

9. The method according to claim 8, wherein the step of determining, according to the error threshold corresponding to the target prediction state and the each second thermal load magnitude corresponding to the each future time period, the thermal load range corresponding to the each future time period, wherein the target steam user uses the boiler steam in the each future period comprises:

calculating an upper critical value and a lower critical value corresponding to the each future time period, wherein the target steam user uses the boiler steam in the each future time period through the following formula (3):

$$y=Y/(1+e) \qquad (3);$$

wherein y represents the upper critical value or lower critical value corresponding to the each future time period, Y represents the each second thermal load magnitude corresponding to the each future time period, and e represents an upper extremum or a lower extremum of the error threshold corresponding to the target prediction state; and determining, according to the upper critical value and the lower critical value, the thermal load range corresponding to the each future time period, wherein the target steam user uses the boiler steam in the each future time period.

10. The method according to claim 9, wherein the plurality of prediction states comprise: an extreme overestimate state, an overestimate state, a normal state, an underestimate state, and an extreme underestimate state; wherein a first error threshold corresponding to the extreme overestimate state is more than 10%;

a second error threshold corresponding to the overestimate state is more than 5% and less than or equal to 10%;

a third error threshold corresponding to the normal state is more than −5% and less than or equal to 5%;

a fourth error threshold corresponding to the underestimate state is more than or equal to −10% and less than −5%; and a fifth error threshold corresponding to the extreme underestimate state is less than −10%.

11. The method according to claim 8, wherein the plurality of prediction states comprise: an extreme overestimate state, an overestimate state, a normal state, an underestimate state, and an extreme underestimate state; wherein a first error threshold corresponding to the extreme overestimate state is more than 10%;

a second error threshold corresponding to the overestimate state is more than 5% and less than or equal to 10%;

a third error threshold corresponding to the normal state is more than −5% and less than or equal to 5%;

a fourth error threshold corresponding to the underestimate state is more than or equal to −10% and less than −5%; and a fifth error threshold corresponding to the extreme underestimate state is less than −10%.

12. A non-transitory readable medium, comprising execution instructions, when a processor of an electronic device executes the execution instructions, the electronic device performing the method according to claim 1.

13. The non-transitory readable medium according to claim 12, wherein the step of determining, according to the first thermal load magnitudes respectively corresponding to the plurality of testing time periods, the relative prediction errors respectively corresponding to the plurality of testing time periods comprises:

acquiring actual thermal load magnitudes respectively corresponding to the plurality of testing time periods, wherein the target steam user uses the boiler steam in the plurality of testing time periods; and calculating the relative prediction errors respectively corresponding to the plurality of testing time periods through the following formula (1):

$$E_i = \frac{F_i - f_i}{f_i};\qquad(1)$$

wherein $E_i$ represents a relative prediction error of the relative prediction errors corresponding to an $i^{th}$ testing time period of the plurality of testing time periods, $F_i$ represents an actual thermal load magnitude of the actual thermal load magnitudes corresponding to the $i^{th}$ testing time period of the plurality of testing time periods, and $f_i$ represents a first thermal load magnitude of the first thermal load magnitudes corresponding to the $i^{th}$ testing time period of the plurality of testing time periods.

14. The non-transitory readable medium according to claim 13, wherein the step of forming the state transition probability matrix according to the relative prediction errors respectively corresponding to the plurality of testing time periods and the error thresholds respectively corresponding to the plurality of prediction states, and the step of determining the state confidence probability of the each prediction state in the each future time period according to the state transition probability matrix comprises:

determining a trusted prediction state of trusted prediction states corresponding to each testing time period of the plurality of testing time periods according to the relative prediction errors respectively corresponding to the plurality of testing time periods and the error thresholds respectively corresponding to the plurality of prediction states;

determining a number of times of state transitions respectively corresponding to prediction state transition types according to the trusted prediction states respectively corresponding to each two adjacent testing time periods of the plurality of testing time periods;

determining a state transition probability corresponding to each prediction state transition type of the prediction state transition types according to the number of times of the state transitions corresponding to the each prediction state transition type;

forming the state transition probability matrix by using the state transition probability corresponding to the each prediction state transition type;

determining an initial probability matrix of the plurality of prediction states in a current time period; and determining confidence probabilities of the plurality of prediction states in the future time periods according to the initial probability matrix and the state transition probability matrix.

15. The non-transitory readable medium according to claim 14, wherein the step of determining the confidence probabilities of the plurality of prediction states in the future time periods according to the initial probability matrix and the state transition probability matrix comprises:

calculating the confidence probabilities of the plurality of prediction states in the future time periods through the following formula (2);

$$X(n)=X(0)*P^n\qquad(2);$$

wherein $X(n)$ represents a confidence probability matrix of the plurality of prediction states in an $n^{th}$ future time period of the future time periods, wherein a cut-off time point of the current time period is taken as a starting time point in the $n^{th}$ future time period, $X(0)$ represents the initial probability matrix corresponding to the current time period, and P represents the state transition probability matrix; and for the each future time period, extracting the confidence probabilities of the plurality of prediction states in the future time periods from the confidence probability matrix corresponding to the each future time period.

16. The non-transitory readable medium according to claim 12, wherein the step of determining, according to the each second thermal load magnitude corresponding to the each future time period, the state confidence probability of the each prediction state in the each future time period, and the error thresholds respectively corresponding to the plurality of prediction states, the thermal load range corresponding to the each future time period, wherein the target steam user uses the boiler steam in the each future time period comprises:

determining a maximum confidence probability from confidence probabilities of the plurality of prediction states in the future time periods;

determining a prediction state of the plurality of prediction states corresponding to the maximum confidence probability as a target prediction state; and determining, according to an error threshold of the error thresholds corresponding to the target prediction state and the each second thermal load magnitude corresponding to the each future time period, the thermal load range corresponding to the each future time period, wherein the target steam user uses the boiler steam in the each future time period.

17. The non-transitory readable medium according to claim 16, wherein the step of determining, according to the error threshold corresponding to the target prediction state and the each second thermal load magnitude corresponding to the each future time period, the thermal load range corresponding to the each future time period, wherein the target steam user uses the boiler steam in the each future period comprises:

calculating an upper critical value and a lower critical value corresponding to the each future time period, wherein the target steam user uses the boiler steam in the each future time period through the following formula (3):

$$y=Y/(1+e)\qquad(3);$$

wherein y represents the upper critical value or lower critical value corresponding to the each future time period, Y represents the each second thermal load magnitude corresponding to the each future time period, and e represents an upper extremum or a lower extremum of the error threshold corresponding to the target prediction state; and determining, according to the upper critical value and the lower critical value, the thermal load range corresponding to the each future time period, wherein the target steam user uses the boiler steam in the each future time period.

18. The method according to claim 1, wherein
the plurality of prediction states comprise: an extreme overestimate state, an overestimate state, a normal state, an underestimate state, and an extreme underestimate state; wherein
a first error threshold corresponding to the extreme overestimate state is more than 10%;
a second error threshold corresponding to the overestimate state is more than 5% and less than or equal to 10%;
a third error threshold corresponding to the normal state is more than −5% and less than or equal to 5%;
a fourth error threshold corresponding to the underestimate state is more than or equal to −10% and less than −5%; and
a fifth error threshold corresponding to the extreme underestimate state is less than −10%.

19. An electronic device, comprising: a processor, a memory, and a bus; wherein the memory is configured to store execution instructions, the processor and the memory are connected through the bus, and when the electronic device runs, the processor executing the execution instructions stored in the memory to cause the processor the perform the method according to claim 1.

20. A thermal load prediction apparatus for facilitate efficient scheduling of boiler steam usage, comprising:
a processor coupled with memory, the processor programmed to:
configure a plurality of prediction states and error thresholds respectively corresponding to the plurality of prediction states, and the pre-processing module configured to form a prediction model corresponding to a target steam user;
call the prediction model to predict first thermal load magnitudes respectively corresponding to a plurality of testing time periods, wherein the target steam user uses a boiler steam in the plurality of testing time periods; and the model calling module configured to call the prediction model to predict second thermal load magnitudes respectively corresponding to future time periods, wherein the target steam user uses the boiler steam in the future time periods;
determine, according to the first thermal load magnitudes respectively corresponding to the plurality of testing time periods, relative prediction errors respectively corresponding to the plurality of testing time periods;
form a state transition probability matrix according to the relative prediction errors respectively corresponding to the plurality of testing time periods and the error thresholds respectively corresponding to the plurality of prediction states, and the state probability determination module configured to determine a state confidence probability of each prediction state of the plurality of prediction states in each future time period of the future time periods according to the state transition probability matrix; and
for the each future time period, determine a thermal load range corresponding to the each future time period, according to the each second thermal load magnitude corresponding to the each future time period, the state confidence probability of the each prediction state in the each future time period, and the error thresholds respectively corresponding to the plurality of prediction states, wherein the target steam user uses the boiler steam in the each future time period, and
schedule the operation of the boiler steam according to the thermal load range with minimum difference between supply and demand of the target steam user.

* * * * *